(12) United States Patent  (10) Patent No.: US 8,852,768 B2
Suto  (45) Date of Patent: Oct. 7, 2014

(54) AQUEOUS ELECTROLYTE BATTERY (71) Applicant: Koji Suto, Susono (JP)

(72) Inventor: Koji Suto, Susono (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/204,689

(22) Filed: Mar. 11, 2014

(65) Prior Publication Data

US 2014/0193697 A1  Jul. 10, 2014

Related U.S. Application Data (63) Continuation of application No. 13/115,609, filed on May 25, 2011, now Pat. No. 8,735,006.

(30) Foreign Application Priority Data

May 25, 2010 (JP) ................................. 2010-119247

(51) Int. Cl.
  *H01M 12/06* (2006.01)
  *H01M 10/04* (2006.01)
  *H01M 8/00* (2006.01)
  *H01M 2/02* (2006.01)

(52) U.S. Cl.
  CPC ..................................... *H01M 2/02* (2013.01)
  USPC ................. 429/49; 429/72; 429/81; 429/162; 429/163; 429/186; 429/231.95; 429/402; 429/499

(58) Field of Classification Search
  USPC .......... 429/49, 72, 81, 162, 163, 186, 231.95, 429/402, 499
  See application file for complete search history.

(56) References Cited

U.S. PATENT DOCUMENTS

| | | | |
|---|---|---|---|
| 6,025,092 A | 2/2000 | Doyle et al. |
| 6,395,428 B1 | 5/2002 | Kezuka |
| 6,787,260 B2 | 9/2004 | Smedley |
| 2003/0170519 A1 | 9/2003 | Mittelstadt et al. |
| 2006/0240274 A1 | 10/2006 | Ohmura et al. |
| 2008/0145756 A1 | 6/2008 | Taniguichi |
| 2009/0311605 A1 | 12/2009 | Visco et al. |
| 2009/0325068 A1 | 12/2009 | Boden et al. |
| 2011/0104571 A1 | 5/2011 | Zhamu et al. |

(Continued)

FOREIGN PATENT DOCUMENTS

| | | |
|---|---|---|
| CN | 2627661 Y | 7/2007 |
| JP | A-09-306439 | 11/1997 |

(Continued)

OTHER PUBLICATIONS

Hasegawa et al.; "Study on lithium/air secondary batteries—Stability of NASICON-type lithium ion conducting glass-ceramics with water;" *Journal of Power Sources*; 2009; pp. 371-377; vol. 189; Elsevier B.V.

(Continued)

*Primary Examiner* — Ula C Ruddock
*Assistant Examiner* — Amanda Barrow
(74) *Attorney, Agent, or Firm* — Oliff PLC (57) ABSTRACT

An aqueous electrolyte battery is provided with a positive electrode, a negative electrolyte, an aqueous electrolyte, and a deposition portion that promotes deposition of discharge product and that is provided at a location that contacts the aqueous electrolyte and that is a location other than at a catalyst included in the positive electrode.

3 Claims, 5 Drawing Sheets

(56) References Cited

U.S. PATENT DOCUMENTS

| | | |
|---|---|---|
| 2012/0237838 A1 | 9/2012 | Uesaka |
| 2012/0264025 A1 | 10/2012 | Suto |
| 2012/0276458 A1 | 11/2012 | Gallant et al. |
| 2014/0193721 A1 | 7/2014 | SUTO |

FOREIGN PATENT DOCUMENTS

| | | | |
|---|---|---|---|
| JP | A-2007-524204 | 8/2007 | |
| JP | A-2008-153097 | 7/2008 | |
| JP | A-2010-176941 | 8/2010 | |
| JP | 2010-244729 | * 10/2010 | ............ H01M 12/06 |
| JP | A-2010-244729 | 10/2010 | |
| JP | A-2011-96456 | 5/2011 | |
| JP | A-2011-96492 | 5/2011 | |
| WO | WO 2005/083829 A2 | 9/2005 | |
| WO | WO 2011/070658 A1 | 6/2011 | |

OTHER PUBLICATIONS

U.S. Appl. No. 13/115,609, filed May 25, 2011 in the name of Koji Suto.

Jul. 5, 2013 Office Action issued in U.S. Appl. No. 13/115,609.

Jan. 17, 2014 Notice of Allowance issued in U.S. Appl. No. 13/115,609.

Jul. 10, 2014 Office Action issued in U.S. Appl. No. 14/204,951.

U.S. Appl. No. 14/204,951 in the name of Koji Sato.

* cited by examiner

AQUEOUS ELECTROLYTE BATTERY

INCORPORATION BY REFERENCE

This is a Continuation of application Ser. No. 13/115,609 filed May 25, 2011, which in turn claims benefit to Japanese Patent Application No. 2010-119247 filed on May 25, 2010. The disclosures of the prior applications, including the specification, drawings and abstract, are hereby incorporated by reference herein in their entirety.

BACKGROUND OF THE INVENTION

1. Field of the Invention

The invention relates to an aqueous electrolyte battery and a manufacturing method of an aqueous electrolyte battery.

2. Description of the Related Art

One type of battery that has an aqueous electrolyte is an air battery. An air battery is a battery that uses oxygen as positive-electrode active material, and takes in air from the outside and uses it while discharging. Therefore, the proportion of negative-electrode active material inside the battery case can be larger than it can be with another battery that has positive-electrode active material and negative-electrode active material inside of it. Thus in principle, the dischargeable electrical capacity of the battery is large, while the battery itself is small and lightweight. Also, the oxidation power of the oxygen used as the positive-electrode active material is strong, so the battery electromotive force is relatively high. Furthermore, oxygen is an unlimited resource and is a clean material, so the environmental effects from an air battery are small. In this way, air batteries offer, many advantages and are therefore promising for use as batteries for mobile devices, electric vehicles, hybrid vehicles, and fuel cell vehicles and the like.

For example, the Journal of Power Sources 189 (2009) 371-377 describes a Li-air battery that uses a separator made of a lithium ion-conducting ceramic ($Li_{1+x+y}Al_xTi_{2-x}Si_yP_{3-y}O_{12}$ (LATP)) and a lithium ion-conducting polymer ($Li_{3-x}PO_{4-y}N_y$ (LiPON)), and that uses a LiCl aqueous solution as an electrolyte. This air battery has excellent performance, with an open circuit voltage of 3.64 V at a room temperature of 25° C., and showing no change in the cell constant even if left for one week. Also, Japanese Patent Application Publication No. 2007-524204 (JP-A-2007-524204) describes an active metal, an electrode structure with an active metal insert, and a battery cell that have an ion-conducting protective structure that has a conductive impermeable layer of active metal (such as lithium) separated from an electrode (i.e., an anode) by a porous separator impregnated with a nonaqueous electrolyte (i.e., anode material). This protective structure protects the cathode side active metal that is arranged on the opposite side of the impermeable layer.

With a metal-air battery that uses an aqueous electrolyte, such as that described in the Journal of Power Sources 189 (2009) 371-377, a gas diffusion electrode that reduces oxygen is used for the positive electrode, metal (such as Li, Zn, or Al) is used for the negative electrode, and an alkaline aqueous solution is used for the electrolyte. In particular, when an aqueous solution Li-air battery discharges, it stores discharge product ($Li^+$ and $OH^-$) in the electrolyte, and when an aqueous solution Li-air battery charges, it consumes the $Li^+$ and the $OH^-$ in the electrolyte and produces Li and oxygen. With this type of battery, the discharge product can be accumulated as ions in the solution such that discharge is possible even if the saturated solubility of the ions is exceeded. However, when the saturated solubility is exceeded, the discharge product turns into ion crystals (LiOH) and these are deposited as a solid. Here, when the discharge product is deposited as a solid due to solution equilibrium, crystal nuclei tend to form where the surface energy is high, such as on a solid surface. That is, crystal nuclei preferentially form on the electrode surface and the inside wall of the battery. In particular, if the atmospheric conditions necessary for crystal growth inside the battery are uniform, the formation of crystal nuclei and the deposition of discharge product tend to occur on the surface of the positive electrode (i.e., the air electrode). Also, if the crystallized discharge product covers the electrode surface that serves as the discharge reaction site, the discharge reaction thereafter will be impeded. In particular, with an air battery, if a product solid is deposited in a hole of the positive electrode that serves as a diffusion path, oxygen that is the reactant will no longer be able to be supplied. Also, the battery reaction at the positive electrode takes place at a triphasic interface of gas, liquid, and solid, so once discharge product is deposited on the triphasic interface, the charging reaction may also be impeded. Moreover, this deposition of discharge product may impede electrolyte diffusion within the electrolyte, causing the solution concentration distribution to become disproportionate, such that ion conduction may be impeded. In this way, in a battery in which discharge product can be dissolved in a solvent, and the discharge product is deposited and stored as a solid from solution equilibrium at or above the saturated solubility, it is important to appropriately control the location where discharge product is deposited to prevent deterioration of the battery. This kind of problem is unable to be solved even if the technology described in the Journal of Power Sources 189 (2009) 371-377 is combined with the technology described in JP-A-2007-524204.

SUMMARY OF THE INVENTION

The invention thus provides an aqueous electrolyte battery (such as an air battery having an aqueous electrolyte, for example) in which battery deterioration due to the deposition of discharge product can be suppressed. The invention also provides a manufacturing method of such an aqueous electrolyte battery.

A first aspect of the invention relates to an aqueous electrolyte battery that includes a positive electrode that includes a positive electrode catalyst, a negative electrode, an aqueous electrolyte, and a deposition portion that promotes deposition of discharge product and that is provided at a location that contacts the aqueous electrolyte and that is a location other than at the positive electrode catalyst. According to this structure, the deposition portion that promotes the deposition of discharge product is provided at a location other than at the positive electrode catalyst. Accordingly, discharge product is preferentially deposited at the deposition portion, thus enabling the deposition of discharge product on the surface of the positive electrode catalyst to be inhibited. Therefore, ion conduction and the electrochemical reaction at the positive electrode are not impeded by the deposition of discharge product, so battery deterioration can be suppressed.

A second aspect of the invention relates to a manufacturing method of an aqueous electrolyte battery provided with a positive electrode, a negative electrolyte, and an aqueous electrolyte, that includes providing a deposition portion, that promotes deposition of discharge product, at a location that contacts the aqueous electrolyte and that is a location other than at a catalyst included in the positive electrode. According to this structure, the aqueous electrolyte battery according to the first aspect described above can be easily manufactured. That is, an aqueous electrolyte battery in which battery deterioration due to the deposition of discharge product can be suppressed can be manufactured.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

In a battery provided with an aqueous electrolyte (such as an air battery provided with an aqueous electrolyte) according to an example embodiment of the invention, when the battery discharges, discharge product ($Li^+$ and $OH^-$ in a lithium-air battery) is stored in the aqueous electrolyte, and when the battery charges, material (such as $Li^+$ and $OH^-$) in the aqueous electrolyte is consumed and oxygen and the like (such as oxygen and Li) are produced. With this type of battery, the discharge product can be accumulated as ions in the solution such that discharge is possible even if the saturated solubility of the ions is exceeded. However, when the saturated solubility is exceeded, discharge product turns into ion crystals (such as LiOH) and these are deposited as a solid. If this solid covers an electrode surface (a positive-electrode surface in particular), the battery will become deactivated and the charge/discharge reactions of the battery will stop. If the location where these ion crystals in the aqueous electrolyte are deposited can be controlled, it is possible to prevent such deactivation of the battery. Through intense study of the deposition of ion crystals in aqueous electrolyte, the inventors have found the following.

In an aqueous electrolyte, a solid precipitates from a solution via two processes, i.e., a nucleus formation process and a growth process. During solid deposition, nano-order structures (such as defects) affect the nucleus formation process, and micro-order structures (such as surface roughness) affect the growth process. For example, micro-order asperities can be formed on the surface in addition to fine defects produced by mechanically roughing the surface (including those defects that were present before the surface was mechanically roughed). More specifically, a large number of lattice defects, steps, and kinks are produced when a metal or crystalline surface is mechanically roughed. With these kinds of defects and the like, unstable atoms and molecules with low coordination numbers tend to be produced, and these strongly interact with the solute to produce and stabilize crystal nuclei.

The resolution to supersaturation of the aqueous electrolyte can be expressed as shown in Expression (2) below by the chemical potential difference between supersaturated solution and saturated solution.

$$\Delta\mu/N = kT\ln(\gamma^* \cdot x^*) - kT\ln(\gamma \cdot x) \quad (2)$$

where $\mu$ is the chemical potential, N is the amount of material, $\gamma$ is the surface tension, x is the concentration, and $\gamma^*$ and $x^*$ are each values during supersaturation.

In view of this, uneven deposition of the aqueous electrolyte tends to occur at a portion of the substrate surface where surface energy (i.e., surface tension) is high. Moreover, once a nucleus has formed, there is a shift to homo-epitaxy (i.e., deposition on the same material).

As described above, it is thought that the micro-order structure contributes to the growth process. Also, the growth of crystals relies on the size of the surface of the growing portion of the substrate. Further, following the formation of a nucleus, there is a material transfer process and a superficial accumulation process. The material transfer process is a process that in which the transfer rate of crystallized components from within the solution to the boundary face affects crystal growth. On the other hand, in the superficial accumulation process, the surface diffusion rate of the deposited nucleus (or the activation energy of surface diffusion) is dominant. In the material transfer process, the transport of material to the surface where supersaturation is resolved by the nuclei formation is the rate limiter. Here, with a rough surface, the boundary face area per unit of space is large. That is, the energy density of the boundary face is high. Therefore, with a rough surface, crystal growth from the material transfer process is fast. On the other hand, the roughness of the surface is also important in the superficial accumulation process. A flat surface where the activation energy of diffusion is low is important to diffuse nuclei over the surface. Accordingly, it is difficult to promote nucleus growth over significant steps and the mountains of different crystal faces. As a result, in the crystal growth process, a flat surface is important for the diffusion of nuclei. This flat surface area affects the amount of crystal growth.

Accordingly, the formation of nuclei can be promoted by exciting defects at the nano level. In addition, asperities at the micro level can provide a boundary face amount and a crystal growth horizon. Nonetheless, in order to promote the deposition of aqueous electrolyte ion crystals, the structure needs to have a rough surface, but a certain degree of flatness is also necessary. Also, it is thought that if a surface having this kind of roughness and a certain degree of flatness can be formed on an aqueous electrolyte contact portion in a battery, ion crystals can be preferentially deposited on this surface, thereby enabling the deposition of ion crystals on the electrode to be suppressed, so deactivation of the battery can be prevented.

The invention is based on this knowledge, and provides a deposition portion, that promotes the deposition of discharge product, at a location that contacts an aqueous electrolyte and that is a location other than at a positive electrode catalyst, in aqueous electrolyte battery provided with a positive electrode, a negative electrode, and an aqueous electrolyte according to example embodiments of the invention.

Figure 1:
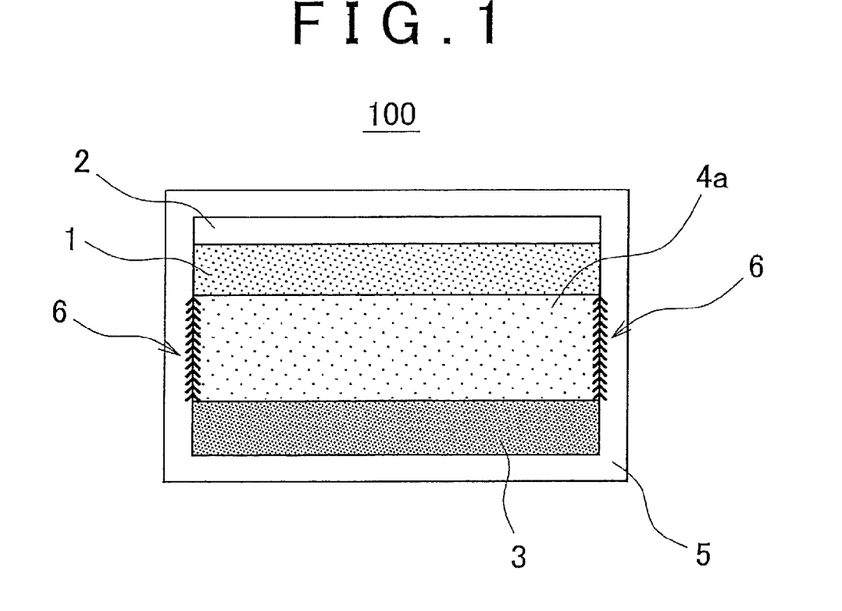
FIG. 1 is a schematic diagram of an air battery according to a first example embodiment of the invention.

An aqueous electrolyte according to example embodiments of the invention will now be described in detail using an air battery as an example. FIG. 1 is a schematic diagram of the structure of an aqueous electrolyte battery 100 (hereinafter simply referred to as "air battery 100") according to a first example embodiment of the invention. As shown in FIG. 1, the air battery 100 has a positive electrode 1, an oxygen layer 2 that supplies oxygen to the positive electrode 1, a negative electrode 3, and an aqueous electrolyte layer 4a interposed between the positive electrode 1 and the negative electrode 3, all of which are housed in a case 5. Also, deposition portions 6 are provided at portions of the inside wall of the case 5 that contact the aqueous electrolyte layer 4a.

The positive electrode 1 is not particularly limited as long as it can function as a positive electrode (i.e., an air electrode) of an air battery, and may take a well-known form. For example, the positive electrode 1 may include conductive material, a catalyst, and a binder that binds the conductive material and the catalyst together. The conductive material included in the positive electrode 1 is not particularly limited as long as it is conductive and can withstand the environment when the air battery 100 is being used. One specific example of this conductive material is carbon material such as carbon black, ketjen black, and mesoporous carbon. Also, from the viewpoint of suppressing a decrease in battery capacity and a decrease in the reaction site and the like, the content of the conductive material of the positive electrode 1 may be no less than 10 percent by mass. Further, from the viewpoint of enabling sufficient catalyst function to be displayed and the like, the content of conductive material in the positive electrode 1 may be no more than 99 percent by mass. Cobalt phthalocyanine and manganese dioxide and the like are examples that may be used as the catalyst in the positive electrode 1. In view of enabling sufficient catalyst function to be displayed and the like, the content of the catalyst in the positive electrode 1 may be no less than 1 percent by mass. Also, from the viewpoint of suppressing a decrease in battery capacity and a decrease in the reaction site and the like, the content of the catalyst in the positive electrode 1 may be no more than 90 percent by mass. Polyvinylidene-difluoride (PVDF) or polytetrafluoroethylene (PTFE) or the like may be used as the binder in the positive electrode 1. The content of the binder in the positive electrode 1 is not particularly limited, but may be no more than 10 percent by mass, or no more than 5 percent by mass and no less than 1 percent by mass, for example.

The positive electrode 1 can be manufactured by, for example, applying paint that includes carbon black, a catalyst, and a binder to a surface of a positive electrode collector that will be described later according to a doctor blade method. Alternatively, the positive electrode 1 can be manufactured by thermo compression bonding a mixed powder that includes carbon black and a catalyst to a surface of a positive electrode collector. The size and thickness of the positive electrode 1 are not particularly limited as long as they enable the air battery 100 to function as an air battery.

The oxygen layer 2 functions to lead oxygen gas present in the case 5 to the positive electrode 1. The oxygen layer 2 provides a passage for the air that is being led to the positive electrode 1. For example, holes provided in a collector that abuts against the inner portion or outer surface of the positive electrode 1 and collects the power of the positive electrode 1 functions as the oxygen layer 2. That is, the oxygen layer 2 may also be described as a positive electrode collector 2.

In the air battery 100, the positive electrode collector functions to collect the power of the positive electrode 1. In this air battery 100, the material of the positive electrode collector is not particularly limited as long as it is conductive material. Some examples of material that can be used as the material of the positive electrode collector are stainless steel, nickel, aluminum, iron, titanium, and carbon. The shape of this kind of positive electrode collector may be mesh (i.e., grid) shaped, for example. The size and thickness of the positive electrode collector are not particularly limited as long as they enable the air battery 100 to function as an air battery.

The negative electrode 3 is not particularly limited as long as it can function as a negative electrode of an air battery, and may take a well-known form. For example, the negative electrode 3 includes metal that functions as negative-electrode active material. Some examples of the metal that can used in the negative electrode 3 are Li, Na, K, Al, Mg, Ca, Zn, and Fe, and alloys of these. From the viewpoint of providing, an air battery 100 with a high capacity, Li may be included. The negative electrode 3 need include at least negative-electrode material, and may also include a binder that fixes the metal described above and the conductive material that improves conductivity and the like. From the viewpoint of suppressing a decrease in battery capacity and a decrease in the reaction site and the like, the content of the conductive material in the negative electrode 3 may be no more than 10 percent by mass. Also, the content of the binder in the negative electrode 3 is not particularly limited, but may be no more than 10 percent by mass, or may be no more than 5 percent by mass and no less than 1 percent by mass, for example. The type and amount used and the like of the conductive material and the binder that may be included the negative electrode 3 may be the same as they are in the positive electrode 1.

In the air battery 100, a negative electrode collector, not shown, may be provided abutting against the inside portion or the outside surface of the negative electrode 3. The negative electrode collector functions to collect the power of the negative electrode 3. In the air battery 100, the material of the negative electrode collector is not particularly limited as long as it is conductive material. Some examples of material that can be used as the material of the negative electrode collector are copper, stainless steel, and nickel. Also, the shape of the negative electrode collector may be foil-shaped, plate-shaped, or mesh (i.e., grid) shaped, for example. In the air battery 100, the negative electrode 3 can be manufactured using the doctor blade method, just like the positive electrode 1, for example. The size and thickness of the negative electrode collector are not particularly limited as long as they enable the air battery 100 to function as an air battery.

The aqueous electrolyte layer 4a is a layer that includes an electrolyte that conducts ions between the positive electrode 1 and the negative electrode 3. This aqueous electrolyte layer 4a includes an electrolyte aqueous solution. The aqueous electrolyte is not particularly limited as long as it can be used as an aqueous electrolyte of an air battery, and may be selected appropriately according to the type of metal ions to be conducted. For example, an alkali metal hydroxide aqueous solution, preferably a LiOH aqueous solution or a KOH aqueous solution may be used. From the viewpoint of having the air battery be a battery with a high capacity, a LiOH aqueous solution may be used. Also, the aqueous electrolyte layer 4a may be such that an aqueous electrolyte is retained in a separator or a gel polymer. Examples that can be used for the separator include a non-woven fabric such as a resin non-woven fabric or fiberglass non-woven fabric, as well as a porous membrane such as polyethylene and polypropylene. Also, as the gel polymer, an acrylate-based polymer, an ether-based polymer such as polyethylene oxide, a cross-linking body that includes these, a methacrylate polymer such as polymethacrylate, or a fluoride-based polymer such as poly-vinylidene fluoride or a copolymer of polyvinylidene fluoride and hexafluoropropylene or the like may be used. The form of the gel polymer may be granular, for example, and is not limited as not as it can retain the aqueous solution. Also, the size and thickness of the aqueous electrolyte layer 4a are also not limited as long as the aqueous electrolyte layer 4a functions appropriately in the air battery. The aqueous electrolyte layer 4a is manufactured by filling an aqueous solution between the positive electrode 1 and the negative electrode 3 inside the case 5, or by soaking an appropriately formed separator or gel polymer filled layer in an aqueous solution so that the aqueous solution is retained in the separator or the gel polymer.

In the air battery 100, the power generating portion is a laminated body in which the oxygen layer 2, the positive electrode 1, the aqueous electrolyte layer 4a, and the negative electrode 3 are laminated together in this order. The method by which the positive electrode 1, the aqueous electrolyte layer 4a, and the negative electrode 3 are laminated together is not particularly limited. That is, an aqueous electrolyte may be filled between the positive electrode 1 and the negative electrode 3, or the aqueous electrolyte layer 4a may be provided between the positive electrode 1 and the negative electrode 3 by arranging a separator or gel polymer between the positive electrode 1 and the negative electrode 3 and soaking the separator or gel polymer in an aqueous electrolyte.

The power generating portion and an oxygen-containing gas are at least housed in the case 5. In the air battery 100, the shape of the case 5 is not particularly limited. For example, part of the case 5 may be mesh-shaped or a supply port may be provided or the like to introduce oxygen-containing gas such as air from the outside, so that oxygen is supplied to the positive electrode 1 of the air battery 100. Alternatively, oxygen-containing gas or the like may be housed and sealed in the case 5 beforehand, so that oxygen is supplied to the positive electrode 1 of the air battery 100. As the constituent material of the case 5, material that can be used for the case of an air battery may be used as appropriate. The oxygen-containing gas that is introduced into the case 5 or that is housed in the case 5 is not particularly limited as long as it includes oxygen. Air, preferably dry air, or oxygen gas or the like at a pressure of $1.01 \times 10^5$ Pa and with an oxygen content of 99.99% or higher may be used.

As described above, in the air battery, ion crystals (i.e., discharge product) are precipitated from the electrolyte when the saturation solubility of the aqueous electrolyte is exceeded. Crystal nuclei of the discharge product tend to form on surfaces with high surface tension, and crystal growth tends to occur at portions with a large specific surface area and the like due to tiny asperities. Also, if there is a structure portion (or a structure) where the deposition of discharge product quickly progresses, deposition occurs preferentially at this structure portion and thus is inhibited from occurring at other locations.

In the air battery of the invention, a deposition portion is provided at a location that contacts the aqueous electrolyte and that is a location other than at the positive electrode catalyst. Discharge product is able to be preferentially deposited here. For example, the deposition portions 6 are provided at locations on the inside wall surface of the case 5 that contact the aqueous electrolyte, as in the air battery 100. The deposition portions 6 may be formed by roughing the surface of the inner wall of the case 5, for example. Here, the inside wall of the case 5 may be made of resin or an inorganic inactive material. In this case, tiny asperities may be formed on the surface either during the formation process of the resin or the like, or by a post-process. When performing post-processing, tiny asperities may be formed on the surface by a method that involves, for example, grinding using grinding means such as a file, or embedding inactive microparticles (of carbon, metal, ceramic, or resin or the like).

The surface of the deposition portions 6 on the side contacting the aqueous electrolyte layer 4a may have asperities with a Kurtosis Rku of 9.96 or higher. With this kind of Kurtosis, when the aqueous electrolyte exceeds the saturated solubility, the discharge product can be preferentially deposited on the surface of the deposition portions 6, so the deposition of discharge product on the surface of the positive electrode 1 can be more appropriately inhibited.

Also, at the surface of the deposition portions 6 on the side contacting the aqueous electrolyte layer 4a, the ten point height of irregularities Rz of the surface from the asperities may be 5.25 µm or greater. Also, the average distance Sm between the asperities may be 10.5 µm or greater. Alternatively, at the surface of the deposition portions 6 on the side contacting the aqueous electrolyte layer 4a, the root-mean-square roughness Rq of the surface from the asperities may be no less than 1 and no greater than 13.5, or may be no less than 4 and no greater than 12. Forming the surface of the deposition portions 6 having such morphology enables the discharge product to be even more preferentially deposited on the surface of the deposition portions 6 when the aqueous electrolyte exceeds the saturated solubility.

As described above, in the air battery 100, the positive electrode 1, the negative electrode 3, and the aqueous electrolyte layer 4a are provided, and the deposition portions 6 that promote the deposition of discharge product are provided at locations (i.e., on the inside wall of the case 5) that contact the aqueous electrolyte layer 4a and that are locations other than at the positive electrode catalyst. Also, with the air battery 100, discharge product is preferentially deposited at the deposition portions 6, thus enabling the deposition of discharge product on the surface of the positive electrode catalyst to be inhibited. Therefore, ion conduction and the electrochemical reaction at the positive electrode 1 are not impeded by the deposition of discharge product, so battery deterioration can be inhibited.

Figure 2:
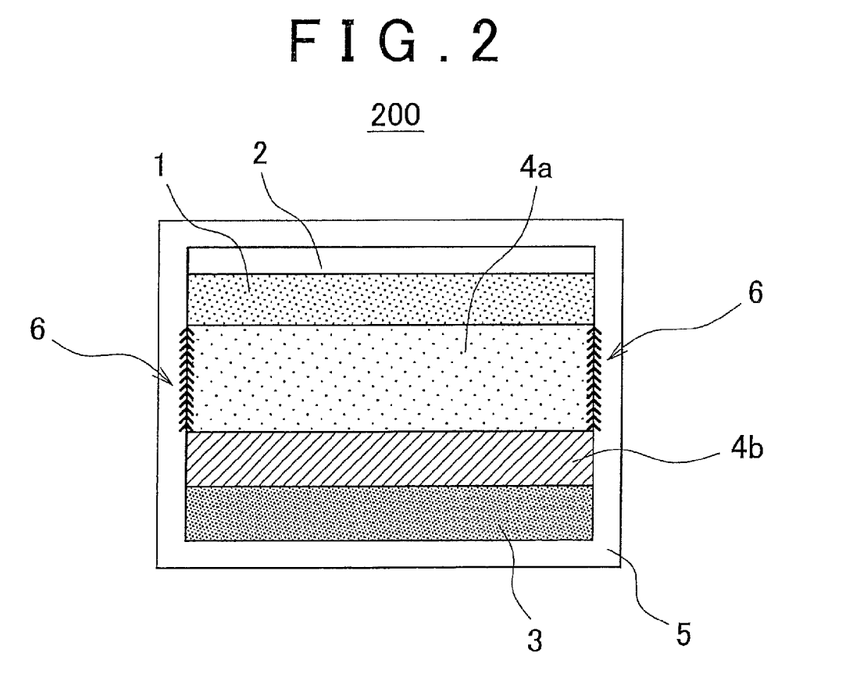
FIG. 2 is a schematic diagram of an air battery according to a second example embodiment of the invention.

FIG. 2 is a schematic diagram of the structure of an aqueous electrolyte battery 200 (hereinafter simply referred to as "air battery 200") according to a second example embodiment of the invention. In FIG. 2, structure that is the same as that of the air battery 100 will be denoted by like reference characters, and descriptions of that structure will be omitted. As shown in FIG. 2, the air battery 200 has a positive electrode 1, an oxygen layer 2 that supplies oxygen to the positive electrode 1, a negative electrode 3, and an aqueous electrolyte layer 4a and a solid electrolyte layer 4b that are interposed between the positive electrode 1 and the negative electrode 3, all of which are housed in a case 5. In the air battery 200, the aqueous electrolyte layer 4a is provided between the positive electrode 1 and the solid electrolyte layer 4b, and the solid electrolyte layer 4b is provided between the aqueous electrolyte layer 4a and the negative electrode 3. Also, deposition portions 6 are provided on portions of the inside wall surface of the case 5 that contact the aqueous electrolyte layer 4a. In this way, the air battery 200 differs from the air battery 100 in that the solid electrolyte layer 4b is provided, in addition to the aqueous electrolyte layer 4a, as an electrolyte layer. Hereinafter, this solid electrolyte layer 4b will be described.

The solid electrolyte layer 4b includes a solid electrolyte. The solid electrolyte is not particularly limited as long as it is a solid electrolyte that can be used in the air battery 200. For example, if the air battery 200 is a lithium-air battery, a solid electrolyte that can be applied to a lithium-air battery, such as any one of a variety of lithium-containing oxides or another lithium-based solid electrolyte, may be used. More specifically, a NASICON-type solid electrolyte such as $Li_{1.5}Ti_2Si_{0.4}P_{2.6}O_{12}$ or $Li_{1.5}Al_{0.5}Ge_{1.5}(PO_4)_3$, a garnet-type solid electrolyte such as $Li_7La_3Zr_2O_{12}$ or $Li_6BaLa_2Ta_2O_{12}$, a perovskite-type solid electrolyte such as $Li_{0.5}La_{0.5}TiO_3$, a LISICON-type solid electrolyte such as $Li_{3.6}P_{0.4}Si_{0.5}O_4$ or $Li_{3.4}V_{0.6}Ge_{0.4}O_4$, a glass-type solid electrolyte such as $Li_2O$—$B_2O_3$, $LiCl$—$Li_2O$—$B_2O_3$, $Li_2O$—$SiO_2$, $Li_2SO_4$—$LiPO_4$, $Li_2O$—$Nb_2O_5$, or $Li_2O$—$Ta_2O_5$, or a solid polyelectrolyte such as polyethylene oxide or a copolymer of polyethylene oxide and ethylglycidylether may be used. The thickness and size of the solid electrolyte are not particularly limited as long as they enable the solid electrolyte to be applied to the air battery 200. The method by which the solid electrolyte layer 4b is manufactured is also not particularly limited. For example, the solid electrolyte layer 4b may be manufactured by mixing a powder-like solid electrolyte and pressure forming it.

With the air battery 200 as well, the deposition portions 6 that promote the deposition of discharge product are provided at locations (i.e., on the inside wall of the case 5) that contact the aqueous electrolyte layer 4a and that are locations other than at the positive electrode catalyst. Accordingly, discharge product is preferentially deposited at the deposition portions 6, thus enabling the deposition of discharge product on the surface of the positive electrode catalyst to be inhibited. Therefore, ion conduction and the electrochemical reaction at the positive electrode 1 are not impeded by the deposition of discharge product, so battery deterioration can be inhibited.

Figure 3:
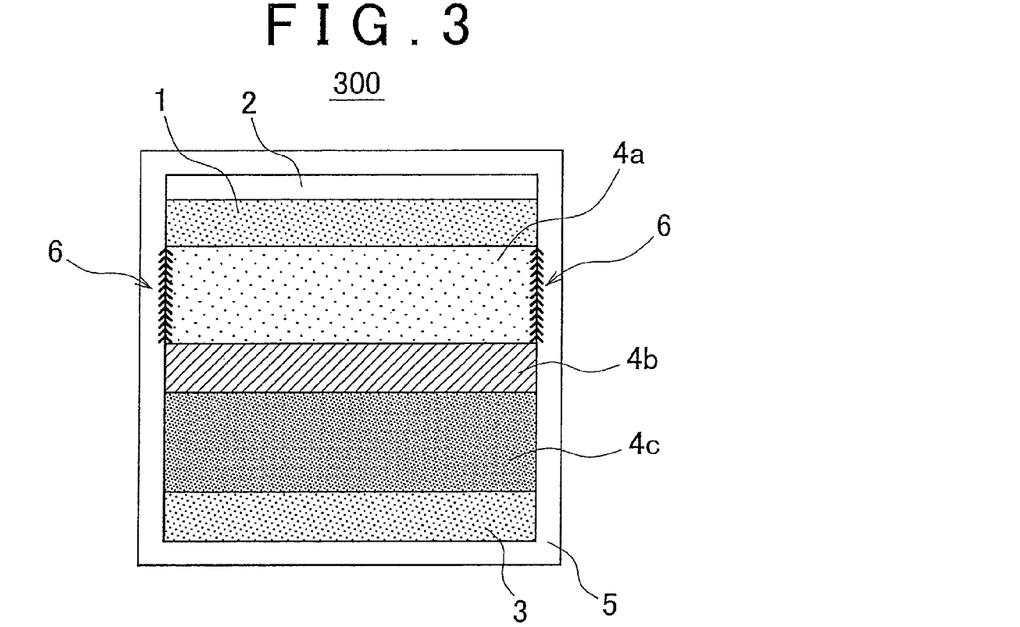
FIG. 3 is a schematic diagram of an air battery according to a third example embodiment of the invention.

FIG. 3 is a schematic diagram of the structure of an aqueous electrolyte battery 300 (hereinafter simply referred to as "air battery 300") according to a third example embodiment of the invention. In FIG. 3, structure that is the same as that of the air battery 100 will be denoted by like reference characters, and descriptions of that structure will be omitted. As shown in FIG. 3, the air battery 300 has a positive electrode 1, an oxygen layer 2 that supplies oxygen to the positive electrode 1, a negative electrode 3, and an aqueous electrolyte layer 4a, a solid electrolyte layer 4b, and a nonaqueous electrolyte layer 4c that are interposed between the positive electrode 1 and the negative electrode 3, all of which are housed in a case 5. In the air battery 300, the solid electrolyte layer 4b is provided between the aqueous electrolyte layer 4a and the nonaqueous electrolyte layer 4c, the aqueous electrolyte layer 4a is provided between the positive electrode 1 and the solid electrolyte layer 4b, and the nonaqueous electrolyte layer 4c is provided between the solid electrolyte layer 4b and the negative electrode 3. Also, deposition portions 6 are provided on portions of the inside wall surface of the case 5 that contact the aqueous electrolyte layer 4a. In this way, the air battery 300 differs from the air battery 100 in that the solid electrolyte layer 4b and the nonaqueous electrolyte layer 4c are provided, in addition to the aqueous electrolyte layer 4a, as electrolyte layers. Hereinafter, this nonaqueous electrolyte layer 4c will be described.

The nonaqueous electrolyte layer 4c is a layer that includes a nonaqueous electrolyte. The type of nonaqueous electrolyte may be selected appropriately according to the type of metal ions to be conducted. For example, the nonaqueous electrolyte when the air battery 300 is a lithium-air battery normally includes lithium salt and a nonaqueous solvent. $LiBF_4$, $LiPF_6$, $LiClO_4$, or LiBOB, or an amide salt such as LiTFSI or LiBETI may be used for the lithium salt included in the nonaqueous electrolyte. Also, examples of the nonaqueous solvent include i) propylene carbonate (PC), ethylene carbonate (EC), dimethyl carbonate (DMC), diethyl carbonate (DEC), ethylmethyl carbonate (EMC), butylene carbonate, γ-butyrolactone, sulfolane, acetonitrile, 1,2-dimethoxymethane, 1,3-dimethoxy-propane, diethyl ether, tetrahydrofuran, 2-methyl-tetrahydrofuran, or a mixture of these, ii) an ionic liquid having a cation such as a quaternary ammonium cation (chain or cyclic), an imidazolium cation, or a pyridinium cation, and an anion such as a TFSA anion, a BETA anion, a FSA anion, a $BF_4$ anion, a $PF_6$ anion, a triflate anion, or a $ClO_4$ anion, or iii) a fluorine solvent such as $C_6F_{14}$, $C_7F_{16}$, $C_8F_{18}$, $C_9F_{20}$, hexafluorobenzene, or hydrofluoroether. The nonaqueous electrolyte layer 4c may also be such that an electrolyte is retained in a separator or a gel polymer, just like the aqueous electrolyte layer 4a. The separator and gel polymer are as described above. The manufacturing of the nonaqueous electrolyte layer 4c is not particularly limited, and may be similar to that of the aqueous electrolyte layer 4a.

With the air battery 300 as well, the deposition portions 6 that promote the deposition of discharge product are provided at locations (i.e., on the inside wall of the case 5) that contact the aqueous electrolyte layer 4a and that are locations other than at the positive electrode catalyst. Accordingly, discharge product is preferentially deposited at the deposition portions 6, thus enabling the deposition of discharge product on the surface of the positive electrode catalyst to be inhibited. Therefore, ion conduction and the electrochemical reaction at the positive electrode 1 are not impeded by the deposition of discharge product, so battery deterioration can be inhibited.

Figure 4:
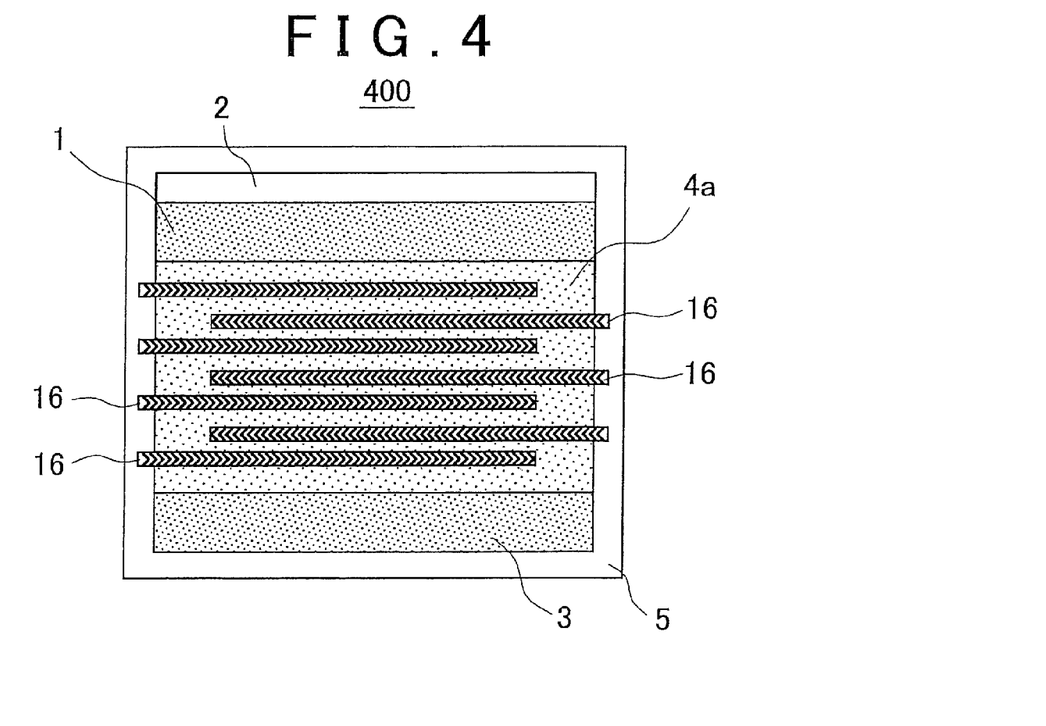
FIG. 4 is a schematic diagram of an air battery according to a fourth example embodiment of the invention.

FIG. 4 is a schematic diagram of the structure of an aqueous electrolyte battery 400 (hereinafter simply referred to as "air battery 400") according to a fourth example embodiment of the invention. In FIG. 4, structure that is the same as that of the air battery 100 will be denoted by like reference characters, and descriptions of that structure will be omitted. As shown in FIG. 4, the air battery 400 has a positive electrode 1, an oxygen layer 2 that supplies oxygen to the positive electrode 1, a negative electrode 3, and an aqueous electrolyte layer 4a interposed between the positive electrode 1 and the negative electrode 3, all of which are housed in a case 5. Also, structures 16 are provided on portions of the inside wall surface of the case 5 that contact the aqueous electrolyte layer 4a. These structures 16 extend from one inside wall surface toward the other opposing inside wall surface. In this way, the air battery 400 differs from the air battery 100 in that the structures 16 are provided instead of the deposition portions 6. Hereinafter, these structures 16 will be described.

The structures 16 are structures that have tiny asperities on the surface that contacts the aqueous electrolyte. These structures 16 are attached to the inside wall of the case 5 and serve as deposition portions. A plurality of the structures 16 may be provided inside the air battery 400, as shown in FIG. 4. Also, enough space (such as gaps of 5 μm to 5000 μm, inclusive, but the distance may be adjusted appropriately according to the viscosity of the solution and the size of the battery) is provided between these structures 16 so that the structures 16 will not interfere with the aqueous electrolyte and the flow of ions therein. The structures 16 are not particularly limited as long as they are able to make discharge product be preferentially deposited on them due to the tiny asperities provided on their surfaces. For example, the structures 16 may be formed by roughing the surface of a rod-shaped or plate-shaped member by grinding or the like (or embedding microparticles with a large specific surface area in the surface), such that asperities are formed on the surface, and then the structures 16 may be fixed by being welded to, adhered to, or engaged with, the inside wall of the case 5 so as to contact the aqueous electrolyte when the battery is complete. The material of the structures 16 is not particularly limited as long as it is able to withstand the environment inside the air battery 400. For example, the structures 16 may be made of resin or inorganic inactive material, just like the deposition portions 6. The shape and size of the structures 16 may be selected appropriate to match the volume of the case 5 and the thickness of the aqueous electrolyte layer 4a.

In FIG. 4, only the structures 16 are provided as the deposition portion of the air battery 400. However, deposition portions 6 may also be provided in addition to the structures 16. That is, the deposition portions 6 may be provided on portions of the surface of the inside wall of the case 5 that contact the aqueous electrolyte, and the structures 16 may be fixed standing upright from one portion of the inside wall of the case 5 toward the other inside wall. This enables the deposition of discharge product on the positive electrode to be inhibited even more.

With the air battery 400 as well, the structures 16 that serve as deposition portions that promote the deposition of discharge product are provided at locations that contact the aqueous electrolyte layer 4a and that are locations other than at the positive electrode catalyst. Accordingly, discharge product is preferentially deposited at the structures 16, thus enabling the deposition of discharge product on the surface of the positive electrode catalyst to be inhibited. Therefore, ion conduction and the electrochemical reaction at the positive electrode 1 are not impeded by the deposition of discharge product, so battery deterioration can be inhibited. Also, many the deposition portions are provided in the air battery 400. Having many deposition portions in this way enables the deposited particles of the discharge product to be broken up. Here, the discharge product that has been microparticulated has a high solution rate during charging so the charging rate can be increased.

Figure 5:
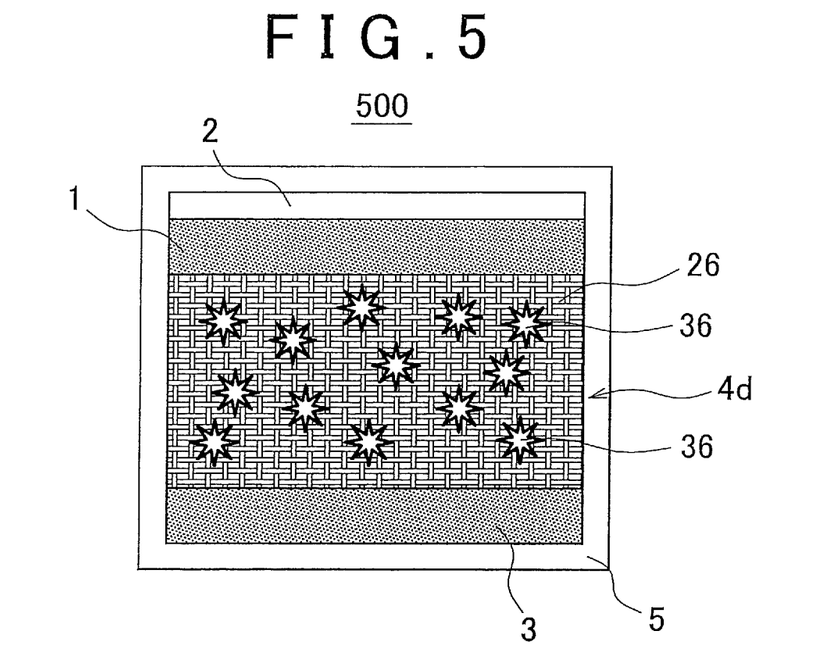
FIG. 5 is a schematic diagram of an air battery according to a fifth example embodiment of the invention.

FIG. 5 is a schematic diagram of the structure of an aqueous electrolyte battery 500 (hereinafter simply referred to as "air battery 500") according to a fifth example embodiment of the invention. In FIG. 5, structure that is the same as that of the air battery 100 will be denoted by like reference characters, and descriptions of that structure will be omitted. As shown in FIG. 5, the air battery 500 has a positive electrode 1, an oxygen layer 2 that supplies oxygen to the positive electrode 1, a negative electrode 3, and an aqueous electrolyte layer 4d interposed between the positive electrode 1 and the negative electrode 3, all of which are housed in a case 5. Also, the aqueous electrolyte layer 4d is formed of a structure 26 impregnated with an aqueous electrolyte, and crystal growth nuclei 36 scattered about inside the structure 26. In this way, the air battery 500 differs from the air battery 100 in that the aqueous electrolyte layer 4d is provided instead of the aqueous electrolyte layer 4a and the deposition portions 6. Hereinafter, the structure 26 and the crystal growth nuclei 36 that are related to the aqueous electrolyte layer 4d will be described.

The structure 26 is a structure that is provided between the positive electrode 1 and the negative electrode 3, and that can be permeated by, and impregnated with, an aqueous electrolyte. The structure 26 may fibrous or film-like. More specifically, the structure 26 may be made of glass material, polymer material, alloy material, ceramic material, or other material that can be used in a separator for a battery. Here, the structure 26 has a rough surface and is fibrous or film-like. Therefore, the structure 26 is able to serve as a deposition portion of the air battery 500. That is, discharge product can be made to be preferentially deposited on the surface of the structure 26. The degree of roughness of the surface of the structure 26 that contacts the aqueous electrolyte may be similar to that of the deposition portions 6, for example.

The crystal growth nuclei 36 serve as the deposition and growth nuclei of discharge product, and are scattered around and carried inside the structure 26. Examples of these crystal growth nuclei 36 are fibrous material and microparticles with a large specific surface area. The specific surface area is preferably such that the specific surface area obtained by a BET method (i.e., (the particle surface area obtained from the gas adsorption amount according to BET)/(the mass of the particle)) is at least two times the specific surface area when it is assumed that a particle of the same weight is a sphere. The material of the crystal growth nuclei 36 is not particularly limited as long as it is able to withstand the environment inside the air battery 500. Examples of materials that may be used for the material of the crystal growth nuclei 36 include glass material, polymer material, alloy material, and ceramic material. The size of the crystal growth nuclei 36 is not particularly limited. For example, crystal growth nuclei 36 in which the particle shape related to a single particle or a secondary particle of an aggregate is approximately 0.5 μm to 3000 μm, inclusive, or in which the fiber length is approximately 0.5 μm to 3000 μm, inclusive, and the fiber diameter (i.e., the length in the direction orthogonal to the longer direction of the fiber, i.e., the width of the fiber) is approximately 0.01 μm to 1000 μm, inclusive, may be used. A plurality of these crystal growth nuclei 36 may be scattered around inside the structure 26.

The aqueous electrolyte layer 4d may be manufactured in the manner described below, for example. That is, a plurality of fibers or films that form the structure 26 are prepared, and then two processes are performed: (1) the crystal growth nuclei 36 are scattered around on the surface of the fiber or the like, and (2) another fiber or the like is laid on top. These processes of (1) and (2) are repeated until the thickness becomes equal to that of the aqueous electrolyte layer 4d. As a result, a plurality of crystal growth nuclei 36 are able to be scattered around inside the structure 26. Alternatively, the crystal growth nuclei 36 may be scattered around inside the structure 26 by kneading the crystal growth nuclei 36 into the fiber or film that forms the structure 26. Then the aqueous electrolyte layer 4d may be manufactured by soaking the structure 26 in an aqueous electrolyte. Or, the crystal growth nuclei 36 may be scattered around inside the structure 26 by soaking the structure 26 in an aqueous electrolyte in which the crystal growth nuclei 36 are dispersed.

In FIG. 5, only the structure 26 and the crystal growth nuclei 36 are provided as deposition portions of the air battery 500. However, in addition to these, deposition portions 6 may also be provided. That is, the deposition portions 6 may be provided on the surface of the inside wall of the case 5 that contacts the aqueous electrolyte layer 4d. This enables the deposition of discharge product on the positive electrode to be inhibited even more.

With the air battery 500 as well, the structure 26 and the crystal growth nuclei 36 that serve as deposition portions that promote the deposition of discharge product are provided at locations that contact the aqueous electrolyte and that are locations other than at the positive electrode catalyst. Accordingly, discharge product is preferentially deposited on the structure 26 and the crystal growth nuclei 36, thus enabling the deposition of discharge product on the surface of the positive electrode catalyst to be inhibited. Therefore, ion conduction and the electrochemical reaction at the positive electrode 1 are not impeded by the deposition of discharge product, so battery deterioration can be inhibited. Also, many the deposition portions are provided in the air battery 500. Having many deposition portions in this way enables the deposited particles of the discharge product to be broken up. Here, the discharge product that has been microparticulated has a high solution rate during charging so the charging rate can be increased.

Figure 6:
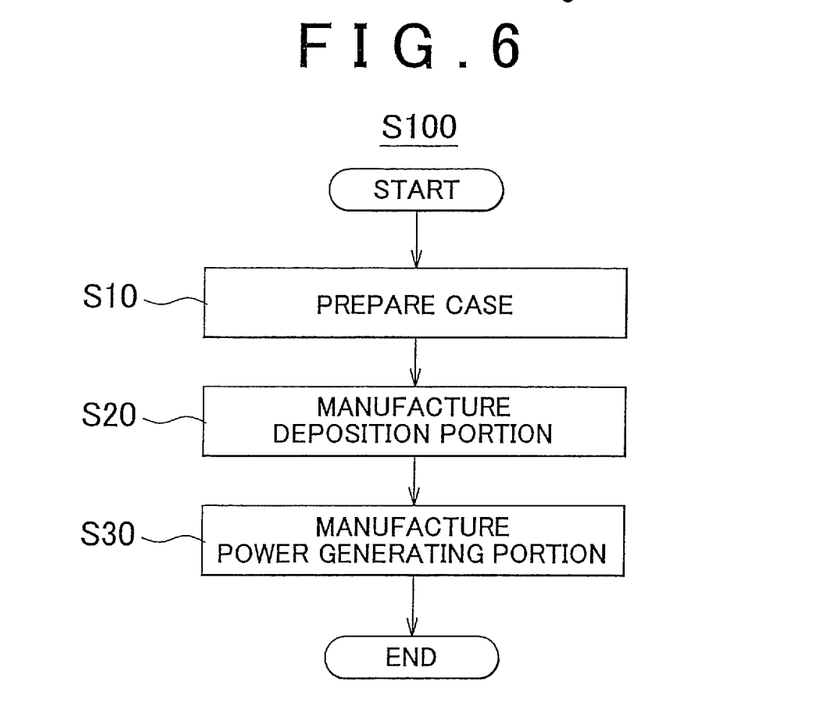
FIG. 6 is a flowchart illustrating an air battery manufacturing method.

FIG. 6 is an example of a manufacturing method of the aqueous electrolyte according to the example embodiments of the invention. As shown in FIG. 6, a manufacturing method S100 includes a step S10 of preparing a case, a step S20 of manufacturing deposition portions, and step S30 of manufacturing a power generating portion. Hereinafter, the manufacturing method S100 will be described as a method applied to the manufacturing of an air battery.

Step S10 is a step of preparing a case that can be used as a case for an air battery. The case 5, for example, may be used for this case.

Step S20 is a step of manufacturing a deposition portion. For example, step S20 may involve providing deposition portions 6 on the case 5 by grinding, using grinding means, locations of the inside wall of the prepared case 5 that will contact an aqueous electrolyte when the battery is complete. Alternatively, step S20 may involve manufacturing a plurality of structures 16 and fixing them to the inside of the case 5. Or, step S20 may involve manufacturing a structure 26 that has a plurality of crystal growth nuclei 36 scattered around inside of it. The details of the deposition portions 6 and the structures 16, and the structure 26 and the crystal growth nuclei 36 are as described above.

Step S30 is a step of manufacturing a power generating portion, inside the case 5. For example, step S30 may involve manufacturing a positive electrode 1 and a negative electrode 3, housing them in predetermined locations in the case 5, and providing an aqueous electrolyte layer 4a (4d) between the positive electrode 1 and the negative electrode 3. Alternatively, step S30 may involve providing a solid electrolyte layer 4b and a nonaqueous electrolyte layer 4c, in addition to the aqueous electrolyte layer 4a, between the positive electrode 1 and the negative electrode 3. In either case, the aqueous electrolyte of the aqueous electrolyte layer 4a (4d) is provided so as to contact the deposition portions 6, the structures 16, or the structure 26 and the crystal growth nuclei 36. The details of the aqueous electrolyte layer 4a (4d), the solid electrolyte layer 4b, and the nonaqueous electrolyte layer 4c are as described above.

An air battery that functions appropriately is then able to be manufactured by appropriately filling and sealing in oxygen after steps S10, S20, and S30. According to the manufacturing method described above, deposition portions are provided at locations that contact the aqueous electrolyte and that are locations other than at the positive electrode. As a result, an air battery in which battery deterioration due to the deposition of discharge product can be inhibited is able to be manufactured. Incidentally, the manufacturing method S100 described above is only one example of the manufacturing method of the air battery according to the invention. The air battery according to the invention may also be manufactured by another method.

A summary overview of the example embodiments of the invention described above is given below.

One example embodiment of the invention relates to an aqueous electrolyte battery that includes a positive electrode having a positive electrode catalyst, a negative electrode, an aqueous electrolyte, and a deposition portion that promotes deposition of discharge product and that is provided at a location that contacts the aqueous electrolyte and that is a location other than at the positive electrode catalyst. According to this structure, the deposition portion that promotes the deposition of discharge product is provided at a location other than at the location of the positive electrode catalyst, so discharge product is preferentially deposited at the deposition portion, thus enabling the deposition of discharge product at the surface of the positive electrode catalyst to be inhibited. Therefore, ion conduction and the electrochemical reaction at the positive electrode are not impeded by the deposition of discharge product, so battery deterioration can be inhibited. Here, discharge product refers to ion crystals that precipitate from the aqueous electrolyte during discharge of the aqueous electrolyte battery, or more specifically, to LiOH or the like. Also, the deposition portion that promotes the deposition of discharge product refers to a portion or member that is able to promote the deposition of discharge product so that discharge product is preferentially deposited at this portion rather than at the location of the positive electrode catalyst. For example, a portion with higher surface tension or a portion with more surface roughness (e.g., greater arithmetic average roughness or ten point height of irregularities) than the electrolyte contacting portion of the positive electrode may be provided at a location that contacts the aqueous electrolyte and that is a location other than at a positive electrode catalyst, and this portion may serve as the deposition portion. More specifically, a structure portion or a structure having asperities of 0.5 to 50 μm, inclusive, may be provided and this portion may serve as the deposition portion. The size, shape, and material of the deposition portion may be set appropriately at a predetermined location inside the aqueous electrolyte battery, and are not particularly limited as long as they enable the deposition portion to withstand the environment inside the aqueous electrolyte battery.

The aqueous electrolyte battery may include a case in which the positive electrode, the negative electrode, and the aqueous electrolyte are housed. Also, the deposition portion may be provided on an inside wall of the case. According to this structure, the inside wall of the case is easy to machine so the deposition portion can be more easily provided. As a result, battery deterioration due to the deposition of discharge product can be suppressed more appropriately.

In the aqueous electrolyte battery, the deposition portion may have asperities on a surface that contacts the aqueous electrolyte. Also, a ten point height of irregularities of the asperities may be equal to or greater than 5.25 μM, and an average distance between the asperities may be equal to or greater than 10.5 μm. According to this structure, discharge product can be made to more preferentially be deposited at the deposition portion. Here, ten point height of irregularities is defined as the sum of the average, for a roughness curve of the deposition portion surface, of five valleys bottoms at the deepest portion and the five highest tops of the roughness curve over a reference length (such as 500 μm) (see Expression (1) below). Also, the average distance between the asperities is defined as the length obtained by measuring the average length of a roughness curve factor over a reference length (such as 500 μm) of the deposition portion surface a predetermined number of times (such as 10 times), and then averaging these measured values. Incidentally, in the examples described later, a VK-9700 laser microscope by Keyence Corporation was used, and the values relating to the ten point height of irregularities Rz, the average distance Sm, and the root-mean-square roughness Rq that will be described later, were identified by taking measurements using the standard definition of the laser microscope.

$$Rz = (1/5) \times \sum_{j=1}^{5} (Z_{peak,j} + Z_{valley,j}) \tag{1}$$

In the aqueous electrolyte battery described above, the deposition portion may have asperities on a surface that contacts the aqueous electrolyte, and a root-mean-square roughness of the asperities may be no less than 1 and no greater than 13.5. According to this structure, discharge product is able to more preferentially be deposited at the deposition portion. Here, the root-mean-square roughness refers to the root-mean-square roughness of the average surface height. For example, for a roughness curve of the deposition portion surface, a line profile over a reference distance (such as 500 μm) may be measured a predetermined number of times (such as 10 times), and the value obtained by averaging these line profiles may be used as the root-mean-square roughness.

The aqueous electrolyte battery described above may also include a case in which the positive electrode, the negative electrode, and the aqueous electrolyte are housed. Also, the deposition portion may be standing upright from one portion of an inside wall of the case pointing toward another portion opposite the one portion.

In the aqueous electrolyte battery described above, the deposition portion may be provided between the positive electrode and the negative electrode, and may be impregnated with the aqueous electrolyte.

Another example embodiment of the invention relates to a manufacturing method of an aqueous electrolyte battery provided with a positive electrode, a negative electrolyte, and an aqueous electrolyte, that includes providing a deposition portion, that promotes deposition of discharge product, at a location that contacts the aqueous electrolyte and that is a location other than at a catalyst included in the positive electrode. According to this structure, the aqueous electrolyte battery according to the example embodiment described above can be easily manufactured. That is, an aqueous electrolyte battery in which battery deterioration due to the deposition of discharge product can be suppressed can be manufactured.

In the manufacturing method described above, providing the deposition portion may include sanding an inside wall of a case in which the positive electrode, the negative electrode, and the aqueous electrolyte are housed. According to this structure, the deposition portion can easily be provided on the inside of the wall of the case by changing the morphology of the surface of the inside wall of the case by sanding the inside wall of the case. Here, sanding refers to making the surface roughness a predetermined roughness by sanding.

In the manufacturing method described above, the deposition portion may have asperities on a surface that contacts the aqueous electrolyte. Also, a ten point height of irregularities of the asperities may be equal to or greater than 5.25 μm, and an average distance between the asperities may be equal to or greater than 10.5 μm. According to this structure, an aqueous electrolyte battery in which discharge product can be more preferentially deposited at the deposition portion can be manufactured.

In the manufacturing method described above, the deposition portion may have asperities on a surface that contacts the aqueous electrolyte, and a root-mean-square roughness of the asperities may be no less than 1 and no greater than 13.5. According to this structure, an aqueous electrolyte battery in which discharge product can be more preferentially deposited at the deposition portion can be manufactured.

In the example embodiments described above, the description focused mainly on a lithium-air battery. However, the invention may also be applied to any battery associated with the formation of salt soluble in an electrolyte during charging or discharging. In particular, the invention is effective with a battery in which the salt content in an electrolyte greatly changes. Examples of such batteries include, in addition to a lithium-air battery, a Daniell cell (Cu|CuSO$_4$|ZnSO$_4$|Zn) and other metal-air batteries that include an aqueous electrolyte and have a negative electrode such as Zn and the like. In any case, the effect of the invention can be displayed by providing a deposition portion at a location that contacts the aqueous electrolyte and that is a location other than at a positive electrode (i.e., a positive electrode catalyst).

Next, an example that is based on the example embodiments described above of the deposition of ion crystals in the aqueous electrolyte will be described in detail. In this example, a test was performed to identify the structure that effectively promotes the deposition of LiOH in a LiOH aqueous solution.

A predetermined roughness was produced on a surface of a piece of acrylic resin measuring 5×10 mm$^2$ by sufficiently sanding the surface of the piece of acrylic resin using sandpaper (four types of sandpaper were prepared: #120, #600, #1500, and #5000). After being sanded, the piece of acrylic resin was then immersed in a saturated LiOH aqueous solution under the following conditions (incidentally, the LiOH solubility was 12.2 g/100 g of water at 50° C., and 11.1 g/100 g of water at 25° C.): (1) Held for 1 hour at 50° C.; (2) Cooled to 25° C. for 1 hour; (3) Left for another 2 hours.

Figure 7:
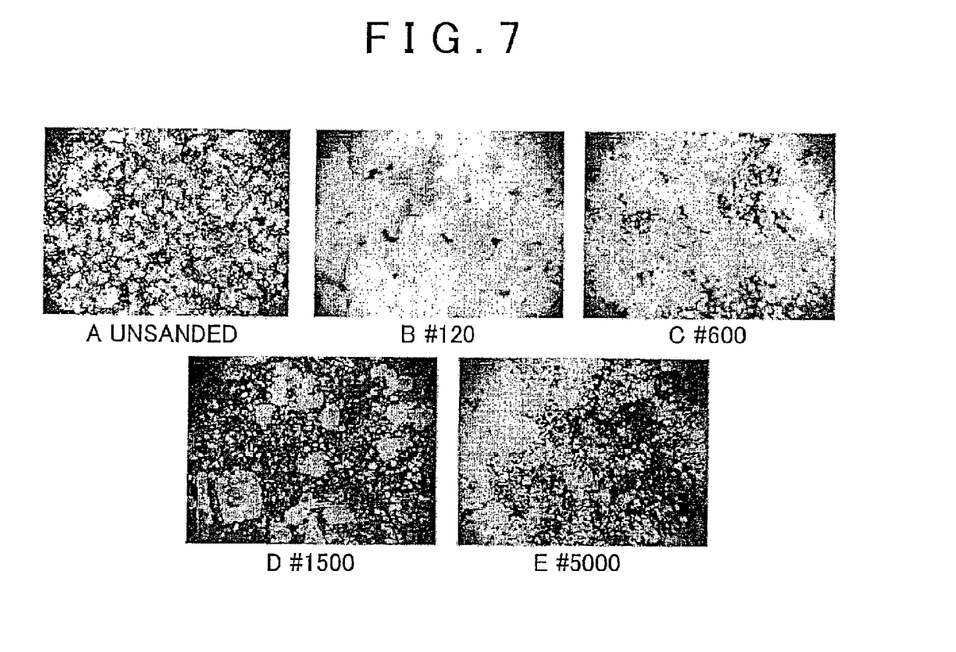
FIG. 7 is a set of photographs showing the morphology of the surface of a piece of acrylic resin according to an example of the invention.
Figure 8:
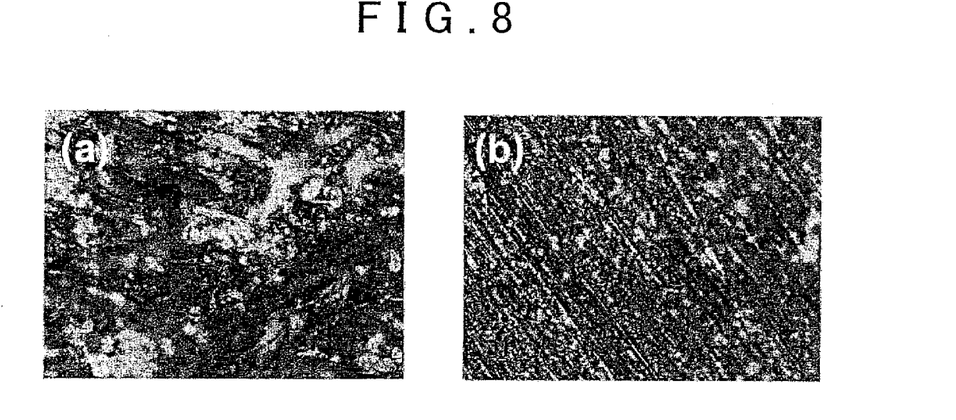
FIG. 8 is a set of photographs showing the morphology of the surface of a piece of acrylic resin according to another example of the invention.

After recrystallizing the LiOH by the operation described above, the piece of acrylic resin was taken out of the saturated LiOH aqueous solution and the aqueous solution was, quickly wiped off with a dry cloth. Table 1 shows the results of the average particle size distribution (μm) of the abrasive particles of the sandpaper, and the weight measurement. Also, the morphology of the surface of the piece of acrylic resin was observed with an optical microscope. FIGS. 7 and 8 show the results. FIG. 7 (FIGS. 7A to 7E) is a set of enlarged photographs of the LiOH deposits on each of the acrylic resin pieces, when the type of sandpaper is changed. FIG. 8 is a set of photographs showing the morphology of the surface of an acrylic resin piece that has been sanded with #120 sandpaper (FIG. 8(a)), and the morphology of the surface of an acrylic resin piece that has been sanded with #600 sandpaper (FIG. 8(b)).

TABLE 1

| Sandpaper grit number | Unsanded | #120 | #600 | #1500 | #5000 |
|---|---|---|---|---|---|
| Average particle size distribution | — | — | 20.0 | 8.0 | — |
| LiOH deposition amount (/g) | 0.01894 | 0.03104 | 0.04465 | 0.02462 | 0.03067 |

From the test results, the deposition of LiOH on the surface sanded with the #600 sandpaper was significant. Also, from the observation results using the optical microscope, it was evident that crystals grow with protruding portions that are roughly the same size as the crystal grain serving as the nuclei. On the other hand, from the observation results using the optical microscope, it was evident that portions where deposits are concentrated and portions without deposits were present unevenly on the surface sanded with the #120 sandpaper. Also, protrusions roughly the same as those of the #600 sandpaper were present in low density on the surface that was sanded with the #120 sandpaper. When finer sandpaper (i.e., sandpaper with a higher grit number) was used, few large crystals formed on the surface, but the deposition amount was 1.5 times more than when the surface was left unsanded. That is, it is evident that LiOH deposition preferentially occurred on the surface roughed by sanding rather than on the smooth surface. Incidentally, the crystals present on the unsanded surface had different growth rates and shapes than the crystals deposited on the sanded surfaces. That is, with the unsanded surface, the LiOH that was evenly deposited within the solution may have adhered to the surface.

Figure 9:
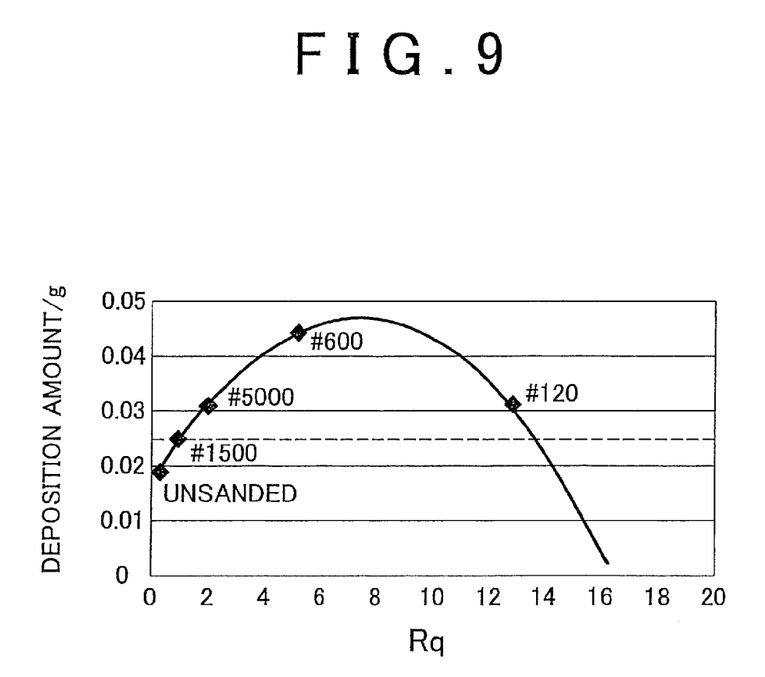
FIG. 9 is a graph showing the relationship between the LiOH deposition amount and the root-mean-square roughness.

Also, FIG. 9 is a graph showing the relationship between the LiOH deposition amount for each type of sandpaper and the root-mean-square roughness Rq of each type of sandpaper. From FIG. 9, it is evident that there is an extremely large value for the deposition amount in the relationship between the LiOH deposition amount and the root-mean-square roughness Rq. For example, when the root-mean-square roughness Rq is between 1 and 13.5, inclusive, the deposition amount becomes equal to or greater than 0.025 g, and when root-mean-square roughness Rq is between 4 and 11, inclusive, the deposition amount is equal to or greater than 0.04 g. That is, quite significant deposition was recognized when the root-mean-square roughness Rq was within a predetermined range.

From these results, it is evident that surface roughness caused by abrasive particles of approximately 25 μm (i.e., #600) most effectively promotes LiOH deposition (i.e., precipitation) and crystallization. Meanwhile, the deposition amount decreases somewhat with abrasive particles of 10.5 μm (i.e., #1500). Therefore, the surface roughness that effectively promotes the deposition (i.e., precipitation) of LiOH in a LiOH aqueous solution may be as follows: (1) Average distance Sm between asperities on surface ≥10.5 μm; (2) Ten point height of irregularities Rz from the asperities on the surface than ≥5.25 μm; (3) Root-mean-square roughness Rq from the asperities is 1 to 13.5, inclusive; (4) Kurtosis Rku from asperities on surface ≥9.96.

An air battery 300 such as that shown in FIG. 3 was prepared (an example). Here, the case was made of clear acrylic resin, and deposition portions 6 were provided by sanding the inside wall of the case. Meanwhile, an air battery with no deposition portions (i.e., unsanded) was also prepared (a comparative example).

When a discharge test was performed under the same conditions for each battery, the permeability of a portion of the case of the air battery of the example decreased. After disassembling the battery and visually observing the inside of it, a white solid had deposited at the sanded location on the inside wall of the case. Meanwhile, the air battery of the comparative example had stopped discharging, which may be attributed to the deposition of discharge product on the positive electrode, causing the deactivation of the battery. Therefore, it is evident that in the air battery provided with an aqueous electrolyte, deactivation of the battery can be prevented by providing a deposition portion, that promotes the deposition of discharge product, at a location that contacts the aqueous electrolyte and that is a location other than at a positive electrode catalyst.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

The air battery of the invention may be used as a power supply for a mobile device, an electric vehicle, or a hybrid vehicle or the like.

What is claimed is:

1. An aqueous electrolyte battery comprising:
   a positive electrode that includes a positive electrode catalyst;
   a negative electrode;
   an aqueous electrolyte;
   a case in which the positive electrode, the negative electrode and the aqueous electrolyte are housed; and
   a first structure that is provided on a first inside wall surface of the case and contacts the aqueous electrolyte, wherein
      asperities are provided on a surface of the first structure and configured to deposit discharge product,
      the first structure is standing upright from the first inside wall surface pointing toward a second inside wall surface of the case, the second inside wall surface of the case opposite to the first inside wall surface, and
      an end portion of the first structure is apart from the second inside wall surface in a standing direction of the first structure, the end portion of the first structure positioned at a side of the second inside wall surface.

2. The aqueous electrolyte battery according to claim 1, further comprising:
   a second structure that is provided on the second inside wall surface and contacts the aqueous electrolyte, wherein
      asperities are provided on a surface of the second structure and configured to deposit discharge product,
      the second structure is standing upright from the second inside wall surface pointing toward the second inside wall surface,
      an end portion of the second structure is apart from the first inside wall surface in the standing direction, the end portion of the second structure positioned at a side of the first inside wall surface, and
      a gap is provided between the first structure and the second structure in a direction perpendicular to the standing direction.

3. The aqueous electrolyte battery according to claim 2, wherein the gap is 5 μm to 5000 μm.

* * * * *